UNITED STATES PATENT OFFICE.

JOHANNES C. BOOT, OF BATH BEACH, NEW YORK.

METHOD OF PRODUCING ALCOHOL AND YEAST.

SPECIFICATION forming part of Letters Patent No. 600,708, dated March 15, 1898.

Application filed December 8, 1896. Serial No. 614,953. (No specimens.)

*To all whom it may concern:*

Be it known that I, JOHANNES C. BOOT, a subject of the Queen of the Netherlands, residing at Bath Beach, in the county of Kings and State of New York, have invented a new and Improved Method of Producing Alcohol and Yeast, of which the following is a full, clear, and exact description.

My invention relates to the production of alcohol and yeast from substances such as syrups, molasses, sugars, and saccharified amylaceous substances.

The object is to produce pure yeast, to increase the yield of alcohol as well as to improve the quality thereof, and to reduce the time required for fermentation. To secure these results, I ferment the saccharine substances in the presence of a chromium compound, as will be hereinafter described and claimed.

In carrying out my invention I take any suitable fermentable substance, particularly sacchariferous substances—such as syrups, molasses, cane-juice, beet-juice, or saccharified amylaceous substances—and ferment them by means of suitable yeast in the presence of a chromium compound. As a rule I employ chromic acid or the salts thereof. The addition of ten grams of chromic acid to one hectoliter of wort or liquor produces an appreciable result in favorably influencing the growth of the yeast, while preventing the development of other ferments. It is well known that secondary fermentations are very often a source of trouble in fermenting various liquors. Such detrimental secondary processes are prevented by my invention, and in consequence thereof the main fermentation may proceed unhindered and is therefore completed in a comparatively short time. Moreover, the products of fermentation are pure and the alcohol is obtained in larger quantities than according to the processes hitherto used.

The proportion of chromic acid may be increased to sixty grams per hectoliter of liquor, or more. The proportions will of course also vary when other chromium compounds are used; but I may state that I have obtained a satisfactory result with thirty grams per hectoliter for every chromium compound that I experimented with.

After the fermentation the yeast may be collected, if wanted, and the alcohol distilled off.

The yeast is obtained pure by the above-described treatment, as the secondary ferments are destroyed or rendered inactive by the chromic acid or other chromium compound. My fermenting process therefore affords a means not only of producing alcohol of superior quality and quantity, but at the same time of obtaining yeast of great purity. The process is a distinctly aseptic fermentation process.

When it is desired to still further improve the quality of the yeast, I may cultivate the yeast before using it in the above-described final fermenting process in a plurality of liquors containing progressively-increasing proportions of chromates or other chromium compounds—that is, I may proceed substantially as follows: I take a suitable saccharine or saccharified wort and ferment it with yeast in the presence of a chromium compound. After a certain time—twenty-four hours being sufficient in many cases—a further quantity of yeast is added. This is done at a time when there is still enough sugar or saccharified matter left in the wort for further fermentation—that is, the original yeast should still be active and not exhausted. The wort thus contains a certain amount of powerful yeast, having acted for some time in the presence of a certain amount of a chromium compound. This wort is added to a new quantity or portion of (unfermented) saccharine liquor, and I admix a chromium salt, as before, but in larger quantity than during the fermentation of the first wort. The mixture is allowed to ferment, and after some time it will be found that the yeast has increased in quantity. The yeast thus obtained has been cultivated in the presence of a larger amount of chromium compound than the yeast in the first wort, and is therefore able to stand the action of a larger amount of such compound. I generally carry on this process until the amount of chromium compound is about eighty grams per hectoliter of liquor. By such progressive treatment I obtain yeast resisting a very great amount of antiseptic (the chromium compound) and capable of fermenting in a very satisfactory manner worts or liquors with lower proportions of antiseptic than the last cultivating liquor. For instance, when the last cultivating liquor contains eighty grams of chromium compound per hectoliter the yeast obtained therefrom can be used with excellent results to ferment liquors containing ten grams or more of chromium compound per hectoliter.

I have hereinbefore described the employment of chromium compounds as antiseptics in alcoholic fermentation and in the cultivation of yeast. I desire it understood, however, that the same agent may be used during the process of converting amylaceous material into grape-sugar, (saccharification,) and then alcoholic fermentation may be produced by means of yeast in the presence of chromic acid to transform said saccharified amylaceous material into alcohol, at the same time obtaining pure yeast, as above described.

I am aware that various substances have been used as antiseptics in fermentation, but chromium compounds are believed to be more effective than any agent used hitherto for the same purpose.

It will be understood that the chromium compound is eliminated from the alcohol during the distillation which follows the fermenting process, as usual.

Having thus described my invention, I claim as new and desire to secure by Letters Patent—

1. The herein-described process of fermenting, which consists in adding a chromium compound to a fermentable substance, and fermenting the mixture, substantially as described.

2. The herein-described improvement in alcoholic fermentation, which consists in adding yeast and a chromium compound to a saccharine substance, and fermenting the mixture, substantially as specified.

JOHANNES C. BOOT.

Witnesses:
ANNE C. H. NYLAND,
JOHAN RO. WIERDSMA.